Nov. 19, 1940.  C. H. GRAHAM  2,221,764
ROAD ROLLER
Filed Oct. 3, 1936  2 Sheets-Sheet 1
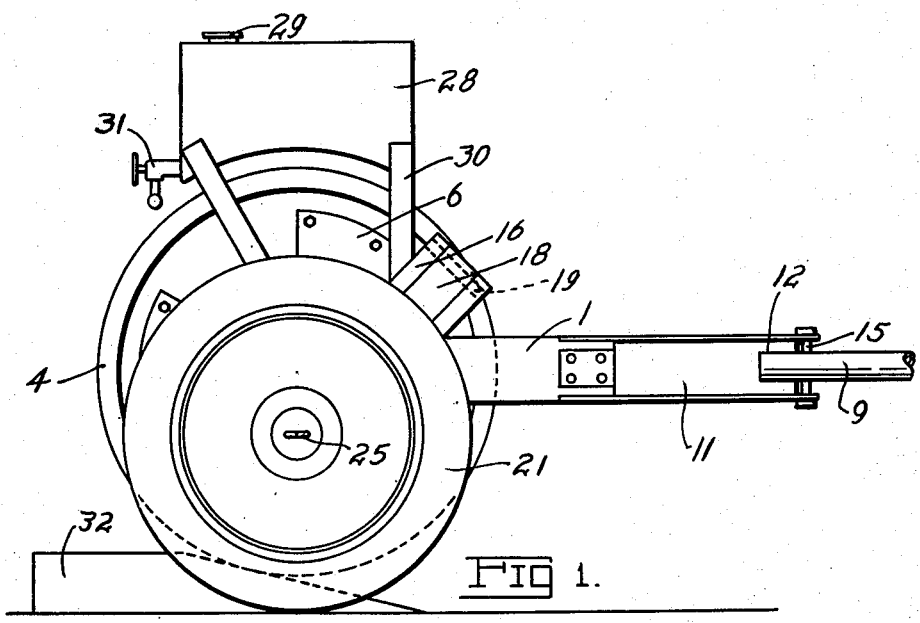
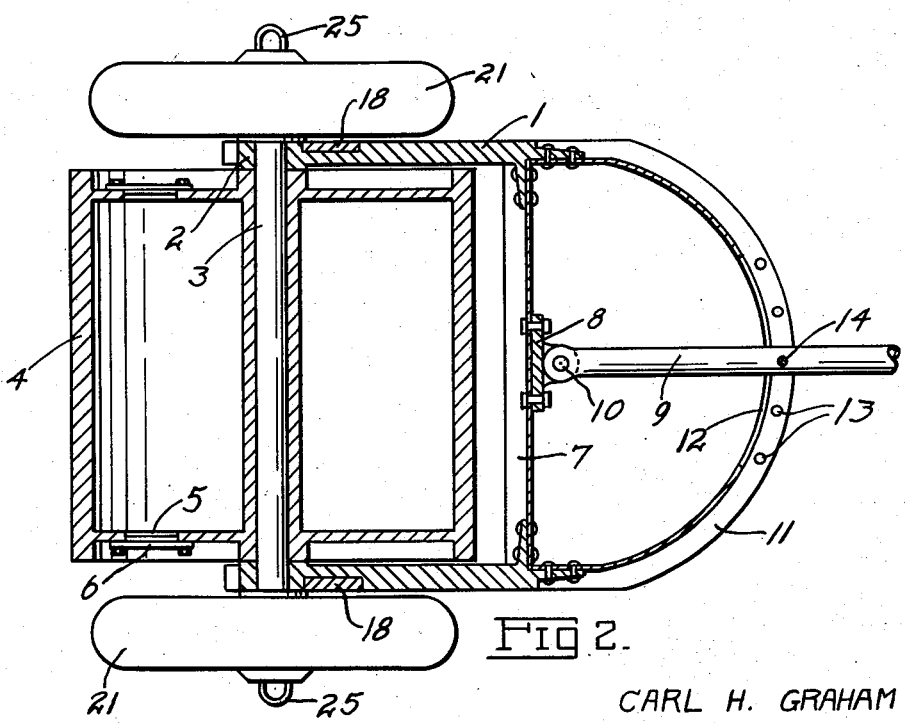
CARL H. GRAHAM
INVENTOR.

Nov. 19, 1940. C. H. GRAHAM 2,221,764
ROAD ROLLER
Filed Oct. 3, 1936     2 Sheets-Sheet 2
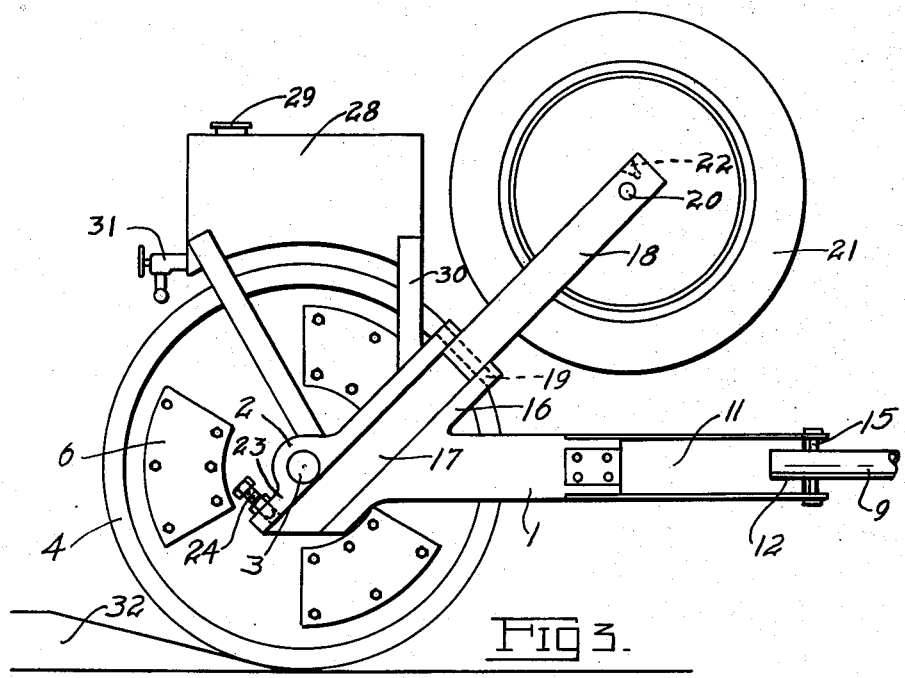
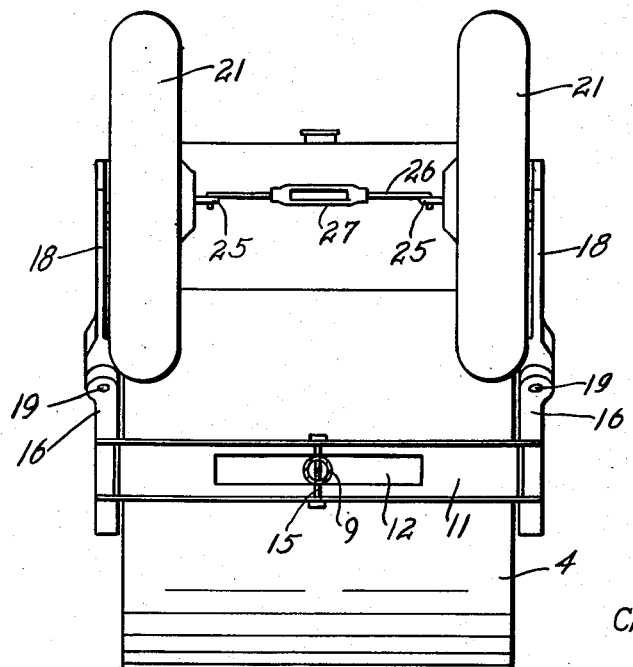
CARL H. GRAHAM.
INVENTOR.

Patented Nov. 19, 1940

2,221,764

UNITED STATES PATENT OFFICE 2,221,764

ROAD ROLLER

Carl H. Graham, Houston, Tex.

Application October 3, 1936, Serial No. 103,813

8 Claims. (Cl. 94—50)

This invention relates in general to road rollers, and has particular reference to that type of roller which is adapted to be rapidly and easily transported from one location to another.

One object of this invention is to provide a roller capable of rapid and comparatively easy transportation from one place to another in which those parts utilized in transporting the roller from one place to another will in no wise interfere with its utility as a roller.

Although it will be appreciated that certain features of this invention are susceptible of being employed in rollers of other types, it is one specific object of this invention to provide a roller adapted to be moved from place to place and operated by a towing vehicle, and to so arrange the various parts that undue stress will not be placed upon the towing vehicle either during the operation of the roller or during its transportation from one place to another.

It is another specific object of this invention to provide a roller assembly having wheels upon which it may be transported from one place to another and to so arrange such wheels that when they are not employed in transporting the roller they will occupy a position which will not interfere in any way with the operation of the roller.

With the foregoing and other objects in view, this invention consists, by way of illustration, of the various parts and combinations illustrated in the accompanying drawings and set forth in the following description. It is to be understood, however, that such drawings and description are not to be taken by way of limitation, but by way of example only, and that this invention is not to be limited except by the prior art, and by the terms of the appended claims.

In the drawings:

Fig. 1 is a side elevation of a device constructed in accordance with this invention with the various parts in position for the device to be transported from one place to another.

Fig. 2 is a view partly in horizontal cross section illustrating the same device.

Fig. 3 is a view similar to Fig. 1 showing the various parts in position for the operation of the roller.

Fig. 4 is a front end elevation illustrating the device with the parts in position shown in Fig. 3.

Referring now more in detail to the drawings, the numeral 1 indicates a frame having bearing portions 2 carrying a shaft 3 extending transversely of the frame upon which shaft is journalled the roller 4. This roller is of the hollow type having openings 5 through its end walls for the purpose of inserting or removing ballast, the plates 6 being provided for closing these openings when they are not in use.

Extending transversely of the frame and forwardly of the roller 4 is a channel-shaped frame member 7 having a bracket 8 secured thereto adjacent its center. A tongue 9 is pivotally secured to this bracket 8 at the point 10, this tongue being for the purpose of moving the roller device either during its transportation from one place to another, or during its operation.

Extending from the opposite sides of the frame at positions adjacent the ends of the member 7 there is a second channel-shaped frame member 11 of arcuate shape and so arranged that its opposite ends extend substantially longitudinally of the main portion of the frame while its intermediate portion is positioned a substantial distance forwardly of the frame member 7 and the bracket 8. This arcuate channel-shaped member 11 intermediate its ends has its web slotted as at 12 so that the tongue 9 may extend therethrough. The flanges of this channel-shaped member adjacent the slot 12 are provided with apertures 13 and the tongue 9 is provided with an opening 14 transversely thereof adapted to be aligned selectively with the various openings 13 in the channel-shaped member 11. When the opening 14 in the tongue is aligned with any of the openings 13, a pin 15 may be passed therethrough to fix the position of the tongue with respect to the frame of the roller device.

Just forwardly of each of the bearing portions 2 of the frame there is provided an upward and forward extension 16 which is integral with the frame, and in which is formed a channel 17 extending forwardly and upwardly. Adjacent the forward and upward end of this channel 17 an arm 18 is secured thereto by means of a pivot 19. This arm 18 at its opposite end carries a stub axle 20 upon which is mounted a wheel 21.

Referring to Fig. 3, it will be noted that the arm 18 at its upper end is formed with a socket 22, and that the portion 16 of the frame in which the channel 17 is formed extends below the main portion of the frame as shown at 23, and carries a set screw 24. When the arms 18 are in their lowermost position, as shown in Fig. 1, in which position the wheels 21 will support the frame and roller for rapid transportation, the set screw 24 is screwed down so that it enters the socket 22 of the arm 18 and latches the arm in its lowermost position.

Each of the stub axles 20 is provided at its outer end with a loop or eye 25 adapted when the wheels are in upper position as shown in Figs. 3 and 4 to receive links 26, these links being joined together by a turnbuckle 27. Thus, when the wheels are in their upper position, the hook-shaped end portions of the links 26 are hooked into the loops 25, and these links are then drawn up tight by the turnbuckle 27 so as to hold the wheels 21 against downward swinging movement.

If found desirable, there may be provided above the roller 4 a tank 28 for the reception of water or the like, this tank being supported from the roller frame by any suitable means such as the bracket arms 30. The tank 28 is provided with suitable filler means 29, and with a device 31 of desirable form for conducting the water, or other liquid, to the surface of the roller.

In operation, the device is employed in rolling a road surface or the like with the parts in the position shown in Figs. 3 and 4. That is, the wheels are positioned upwardly and forwardly with respect to the roller element 4, and at least in part overlie its path. When in this position, it will be seen that the wheels will overlie the forward portion of the frame, and will serve to in a measure balance the frame with respect to the roller and make for comparatively easy operation. At the same time, it will be noted that they do not extend rearwardly of the rearmost portion of the roller, but that instead this rearmost portion of the roller is substantially the rearmost portion of the entire device. For this reason, the roller may be backed up to any wall or similar structure without any hindrance from the wheels or any other projecting part of the apparatus. It is further noted that there are no projecting parts on the ends of the roller which will prevent it from being operated lengthwise of a wall or the like in close proximity thereto. Instead, the wheels 21 in their upper position will at least in part overlie the path of the roller and will not project substantially beyond the ends of the roller. Thus they will form no substantial interference with the operation of the roller in close proximity to a structure such as mentioned.

When it is desired to transport the roller from one place to another, the roller is moved up onto an inclined or wedge-shaped block 32, or the like, so as to raise the frame a short distance above its normal working height. When this has been done, the turnbuckle 27 may be loosened and the links 26 removed, whereupon the wheels and arms 18 may be swung outwardly and downwardly to the position shown in Fig. 1. When the wheels have been swung to their lowermost and rearmost position, the set screw 24 may then be screwed down to engage the socket 22 and the roller is ready for transportation.

It will be seen that by the foregoing a means has been provided for carrying out all the objects and advantages sought by this invention.

It will be more particularly noted that in the device set forth the wheels when the device is in position for rolling a road surface, or the like, will occupy a position forwardly of the rearmost portion of the roller, and that they will overlie the path of the roller so that they will in no wise interfere with its operation in close proximity to such objects as walls, fences and the like. It is further to be noted that the wheels when in their upper and forward position serve to balance the weight of the entire apparatus in a manner which will enable it to be most easily handled. It is noted, for instance, that if the tongue be disconnected from the towing vehicle with the wheels in the position shown in Fig. 3, the tongue will immediately drop to the ground, and will not tend to fly upward as it would if the device were balanced in some different manner.

The arrangement set forth is thus particularly adapted to rollers of that type which are operated by a towing vehicle. It is, however, readily adaptable to any type of roller equipment adapted to be transported rapidly from one place to another.

Having described my invention, I claim:

1. In a device of the character set forth, a frame, a roller journalled in said frame, and wheels mounted on said frame and movable into and out of engagement with a road surface, said wheels when out of engagement with such road surface occupying a position at least partially overlying the path of said roller and pointing in the direction of the tongue attached to the device, said roller, when said wheels are in said last mentioned position, extending in one horizontal direction rearwardly of the axis of said roller beyond both said frame and said wheels.

2. In a device of the character set forth, a frame, a roller journalled in said frame, and wheels swingingly mounted on said frame to swing about an axis spaced from the axis of said roller and movable into and out of engagement with a road surface, said roller, when said wheels are out of engagement with such road surface, extending in one horizontal direction rearwardly of the axis of said roller beyond both said frame and said wheels.

3. In a device of the character set forth, a frame, a roller journalled in said frame, and wheels mounted on said frame and movable into and out of engagement with a road surface, said roller, when said wheels are out of engagement with such road surface, extending in one horizontal direction rearwardly of the axis of said roller and as far as any portion of said device, and said wheels when in such position overlying the path of said roller and pointing in the direction of the tongue attached to the device.

4. In a device of the character set forth, a frame, a roller journalled in said frame and extending beyond said frame in one horizontal direction rearwardly of the axis of said roller, and wheels swingingly mounted on said frame for downward swinging movement into engagement with a road surface and for upward swinging movement out of engagement with such surface, such movements being about an axis substantially perpendicular to the axis of said roller and so inclined that upon such downward movement said wheels will have a horizontal movement toward said portion of the roller which extends beyond said frame, and upon such upward movement said wheels will have a horizontal movement away from such portion of the roller.

5. In a device of the character set forth, a frame, a roller journalled in said frame and extending beyond said frame in one horizontal direction rearwardly of the axis of said roller, and wheels mounted on said frame and movable downwardly and toward that portion of the roller which extends beyond said frame in said one direction, and upwardly and away from that portion of the roller which extends beyond said frame in said one direction, said wheels when in their lower position extending further beyond the ends of said roller than when in their upper position.

6. In a device of the character set forth, a frame, a roller journalled in said frame and extending beyond said frame in one horizontal direction rearwardly of the axis of said roller, and wheels mounted on said frame and movable downwardly and toward that portion of the roller which extends beyond said frame in said one direction and upwardly and away from said portion of the roller which extends beyond said frame in said one direction and pointing in the direction of the tongue attached to the device, said roller, when said wheels are out of engagement with such road surface extending in said one horizontal direction beyond said wheels.

7. In a device of the character set forth, a frame, a roller journalled in said frame and extending beyond said frame in one horizontal direction rearwardly of the axis of said roller, and wheels mounted on said frame and movable downwardly and toward that portion of the roller which extends beyond said frame in said one direction and upwardly and away from said portion of said roller, said wheels when in their uppermost position occupying a position overlying the path of said roller and on the opposite side of the axis of said roller from that portion of the roller which extends beyond the frame in said one direction.

8. In a device of the character set forth, a frame, a roller journalled in said frame and extending beyond said frame in one horizontal direction rearwardly of the axis of said roller, arms swingingly connected with said frame for movement upwardly and away from that portion of said roller which extends beyond said frame in said one direction and for movement downwardly and toward that portion of said roller which extends beyond said frame in said one direction, wheels mounted on said arms, respectively, and adapted when said arms are swung to their lower position to support said frame and roller, and when said arms are in their upper position to occupy a position at least partially overlying the path of said roller and pointing in the direction of the tongue attached to the device, said roller, when said arms are in their upper position extending beyond said wheels in the same direction in which it extends beyond said frame.

CARL H. GRAHAM.